(No Model.)
W. D. STILLMAN.
ROASTER.
No. 446,033.      Patented Feb. 10, 1891.
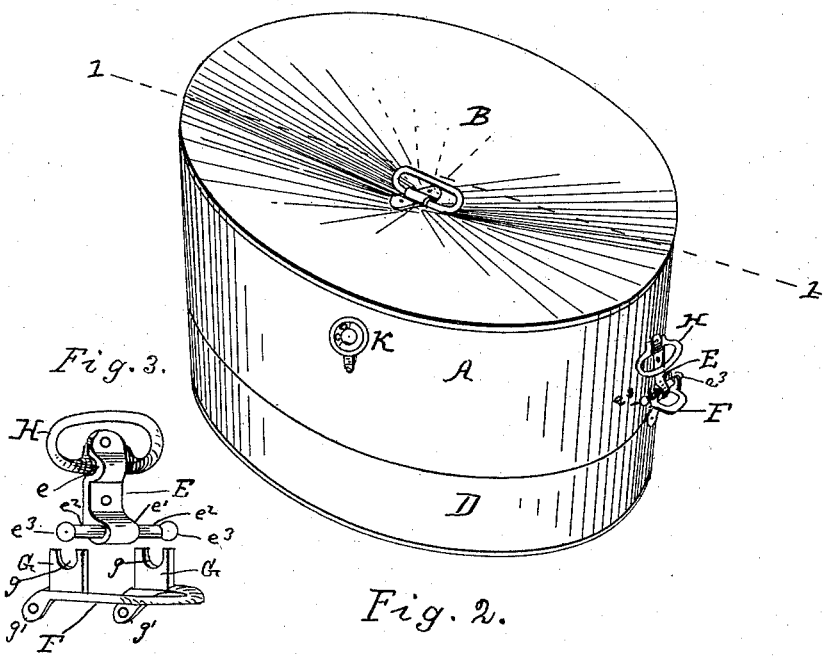
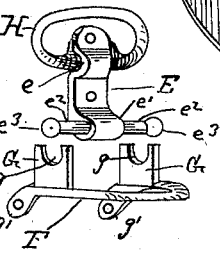
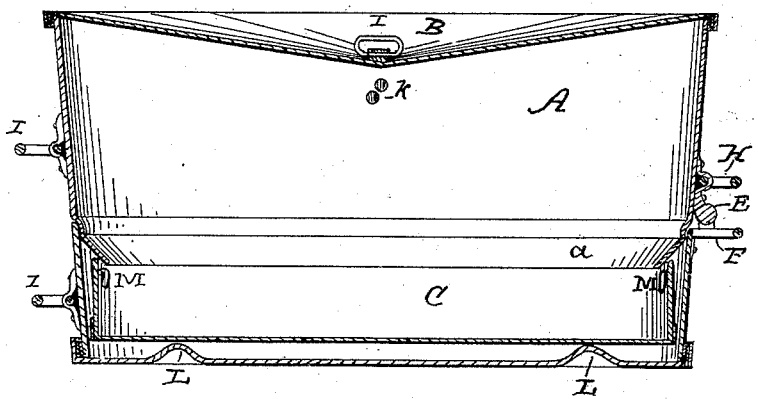
Witnesses
Thos. S. Houghton.
H. E. Cowell.
Inventor
Willett D. Stillman
By Henry B. Munn
his Attorney

UNITED STATES PATENT OFFICE.

WILLETT D. STILLMAN, OF MADISON, WISCONSIN.

ROASTER.

SPECIFICATION forming part of Letters Patent No. 446,033, dated February 10, 1891.

Application filed July 28, 1890. Serial No. 360,146. (No model.)

*To all whom it may concern:*

Be it known that I, WILLETT D. STILLMAN, a citizen of the United States, residing at Madison, in the county of Dane and State of Wisconsin, have invented certain new and useful Improvements in Roasters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of this invention is to provide a roasting-pan for use in an oven, by means of which meats, fowl, or game may be nicely roasted, self-basted, and browned with certainty and with very little trouble.

The roaster may be made rectangular, round, or elliptical in shape. I prefer the latter as being more nearly conformable to the shape of fowl and other roasts.

Figure 1 is a perspective view of an elliptical roaster embodying my invention. Fig. 2 is a vertical longitudinal section on line 1 1 of Fig. 1, and Fig. 3 is a perspective view of the combined hinge and handle used at one end of the device.

The roaster consists of three separate parts, two pans and one cover.

A is the body portion, and B the top of the cover, of the roaster. The lower portion of the cover is flanged inwardly, as at $a$, so as to project over into the meat-pan C, as shown in Fig. 2. The top B of the cover is in the shape of an inverted cone and centers in the middle of the pan.

Pan C is made in shape to conform to the shape of the lower portion D of the roaster and is provided with usual wire handles M at each end.

L L are indented supports in the bottom of the roaster-pan C to keep its contents from being burned.

The two parts A and D of the roaster are adjustably secured together by the combined hinge and handles, shown in detail in Fig. 3.

E is the upper part or equivalent of one leaf of the hinge, with the pintle $e'$ and $e^2$ projecting from E and having a little knob or ball $e^3$ at each end of said pintle. $e$ is a recess near the upper end of said part E, adapted to receive a handle H.

F is a handle having lugs $g'$ $g'$, by which it is riveted fast to the lower pan D.

G G are two upright standards provided with semicircular recesses $g$, into which the pintle of the hinge is supported.

I I are ordinary handles used on roasters, pans, &c.

K is a ventilator near the top of the roaster.

The conical top pointing toward the inverted center will cause all the condensation to baste the meat in the center, from which it will spread all over the same, while at the same time any drippings condensed on the sides of the cover will be conducted by flange $a$ into pan C.

The combined hinge and handles herein shown will give a ready means of looking at the meat without taking the cover entirely off, which may sometimes be very inconvenient.

What I claim as new, and desire to secure by Letters Patent, is—

In a roaster, a cover provided with an inverted conical top and bottom, and inwardly-projecting flange $a$, in combination with a lower portion whose bottom is provided with upwardly-projecting supports for the support of the meat-pan, as herein set forth.

In testimony whereof I affix my signature in presence of two witnesses.

WILLETT D. STILLMAN.

Witnesses:
M. C. CLARKE,
JOHN J. REINKING.